United States Patent [19]
Ayanoglu et al.

[11] Patent Number: 5,570,367
[45] Date of Patent: Oct. 29, 1996

[54] ASYMMETRIC PROTOCOL FOR WIRELESS COMMUNICATIONS

[75] Inventors: Ender Ayanoglu, Red Bank; Richard D. Gitlin, Little Silver, both of N.J.; Thomas F. La Porta, Thornwood, N.Y.; Sanjoy Paul, Atlantic Highlands; Krishan K. Sabnani, Westfield, both of, N.J.

[73] Assignee: Lucent Technologies Inc., Murray Hill, N.J.

[21] Appl. No.: 282,254

[22] Filed: Jul. 29, 1994

[51] Int. Cl.$^6$ ........................................................ H04J 3/16
[52] U.S. Cl. .................. 370/94.1; 370/95.2; 370/110.1; 371/32; 379/58; 455/89; 455/54.2
[58] Field of Search ..................... 370/13, 17, 29, 370/32, 60, 85.7, 85.8, 91, 94.1, 95.1, 95.2, 110.1; 371/32, 33, 67.1, 68.2, 69.1; 379/56, 58, 59; 455/53.1, 54.1, 54.2, 56.1, 67.1, 68, 70

[56] References Cited

U.S. PATENT DOCUMENTS 5,046,066  9/1991  Messenger .............................. 370/94.1
5,103,445  4/1992  Östlund ..................................... 370/79
5,212,806  5/1993  Natarajan ................................ 455/33.2

OTHER PUBLICATIONS

D. D. Clark, M. L. Lambert, L. Zhang, "NETBLT: A High Throughput Transport Protocol", Proceedings of the ACM SIGCOMM '87 Workshop, vol. 17, No. 5, Aug. 11–13, 1987.

A. N. Netravali, W. D. Roome, K. K. Sabnani, "Design and Implementation of a High–Speed Transport Protocol", IEEE Transactions on Communications, vol. 38, No. 11, Nov., 1990.

*Primary Examiner*—Alpus H. Hsu
*Assistant Examiner*—Ricky Ngo
*Attorney, Agent, or Firm*—John A. Caccuro; Jean-Robert Mirville

[57] ABSTRACT

A wireless communications system is arranged to provide data communications services, including error recovery, between at least one wireless end-user device and at least one one base station. The wireless end user device(s) receives(s) from the base station(s) unsolicited messages indicative of the status of data packets received by the base station(s). The wireless end-user device(s) transmit acknowledgement and request for retransmission messages only upon request, or when all the packets within a block of such packets have been received.

8 Claims, 6 Drawing Sheets

ASYMMETRIC PROTOCOL FOR WIRELESS COMMUNICATIONS

TECHNICAL FIELD

This invention relates to wireless communications, and more particularly to a reliable link layer protocol for wireless communications.

BACKGROUND OF THE INVENTION

Because wireless data connections use radio signals that are propagated in the constantly changing and somewhat unpredictable freespace environment, those connections are subject to high bit error rates. Correction of these errors requires frequent data retransmissions over the wireless connection, which causes throughput degradation due to the delay incurred during the error correction process. This delay takes on added significance when one considers that most higher layer protocols for a substantial number of application processes implement error-recovery on an end-to-end basis. To make matters worse, unexpectedly high bit error rates cause certain widely used higher layer protocols, such as TCP/IP, to automatically initiate flow control procedures which further decrease throughput. The resulting low throughput of wireless data connections is most disconcerting to users because of the relatively high cost of wireless data communications.

SUMMARY OF THE INVENTION

We have realized that a robust and reliable link layer protocol for wireless segments of data connections would minimize occurrences of end-to-end recovery and, thereby, increase throughput, since the great majority of the errors in wireless data connections occur in the wireless segment of those connections.

The present invention is directed to a wireless communications system for providing data communications services including error recovery, between at least one base station and at least one wireless end-user. In accordance with the principles of the invention, the wireless end-user device receives a) unsolicited periodic status messages indicative of the reception or lack thereof of data packets transmitted thereto, and b) polling messages inquiring about the status of data packets that were previously transmitted to the wireless end-user device by the base station, but remain unacknowledged by the wireless end-user device after a predetermined period of time following the transmission of those packets. The wireless end-user device transmits acknowledgement and request for retransmission messages only upon request, or when all the packets within a group of contiguous packets (commonly called a "block") have been received. The base station stores channel information for the wireless link, and status information of received and transmitted data packets.

Because wireless mobile end-user devices have restricted electrical power, CPU and memory, the invention relies on the base station(s) of the wireless network to perform most of the message processing functions.

In an embodiment of the invention, wireless end-user devices at the base station combine acknowledgments for multiple data packets into a single acknowledgment code for the purpose of conserving power in those devices. As part of their status message processing functions, the base stations transmit periodic status messages to the wireless end-user devices.

In accordance with the principles of the invention, channel and packet status information associated with a data connection migrates from one base station to another base station as a wireless end-user device is moved from one switching or cellular entity to another switching or cellular entity e.g., cell site, Mobile Telephone Switching Office (MTSO).

DETAILED DESCRIPTION

Figure 1:
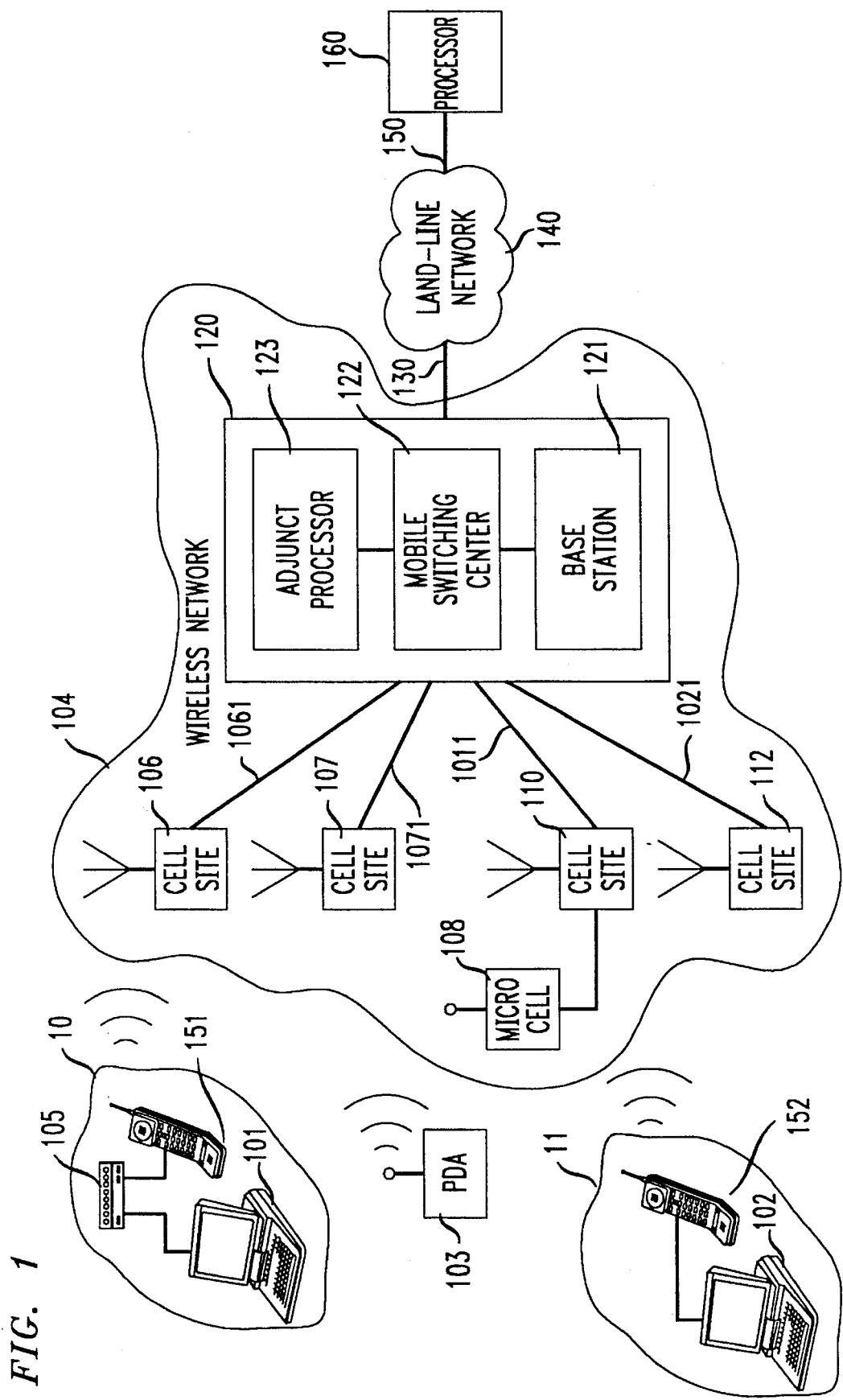
FIG. 1 is a block diagram of a wireless network arranged to facilitate communications between portable processing devices and a processor connected to the wireless network via a land-line network.

Shown in the block diagram of FIG. 1 are end-user devices 101, 102 and 103 that are arranged to communicate with a processor 160 via a wireless network 104 and a land-line network 140. End user devices depicted in FIG. 1 include a laptop computer 101, a notebook computer 102 and a Personal Digital Assistant (PDA) 103 that is a low-mobility portable computing device comprised of a mobile telephone set and optionally a built-in modem. End-user devices 101, 102 and 103 are portable, battery-powered computing devices with enough storage capacity to contain the call processing instructions for performing the processes and steps illustrated in FIGS. 3, 4, 5 and 6, as described below. Laptop computer 101 and notebook computer 102 are coupled to mobile phones 151, and 152, respectively, via an RJ11 adapter (not shown). Mobile telephone sets 151 and 152 tune to the channels of wireless network 104 to receive and transmit signals over the free-space environment to the nearest cell site of network 104.

Wireless network 104 may be an analog communications system using, for example, the Advanced Mobile Phone Service (AMPS) analog cellular radio standard. A detailed description of an AMPS-based communications system is provided in Bell System Technical Journal, Vol. 58, No. 1, January 1979, pp 1–14. Alternatively, wireless network 104 may be a digital communications system implementing well-known code division multiple access (CDMA) or time-division multiple access (TDMA) techniques. Further information on TDMA and CDMA access techniques can be found in AT&T Technical Journal, Vol. 72, No. 4, July/August 1993, pp 19–26.

When wireless network 104 uses the AMPS standard, modems are needed for the end-user devices 101, 102 and 103 to communicate with the wireless network 104. Cellular radio modems are sometimes integrated in a device, as may be the case for PDA 103 and notebook computer 102. Alternatively, cellular radio modems may be stand-alone devices, as in the case for modem 105. Cellular radio modems modulate data signals received from end user devices 101, 102 and 103 for transmission over the RJ11 adapter to mobile phones 151 and 152. The latter modulate the signal received from the modems onto a cellular carrier for transmission to a transceiver of a cell site described in further detail below. A widely used modem for wireless communications is the AT&T Paradyne 3700 Modem, which adheres to the Personal Computer Memory Card International Association (PCMCIA) standards.

When wireless network 104 is a CDMA-based or TDMA-based digital system, no modem is needed for end-user devices 101, 102 and 103. However, cellular telephone set 151,152 and the telephone set integrated with PDA 103 must implement a physical layer protocol, such as the well-known Radio Link Protocol (RLP), for communications with the digital wireless network 104. To avoid repeating trifling distinctions between analog and digital implementations, laptop computer 101, cellular telephone set 151 and optionally modem 105 (when applicable) are referred collectively as cellular computing device 10, while notebook computer 102 and cellular telephone set 152 are collectively called cellular computing device 11. Note that end-user devices 101 and 102 can alternatively represent facsimile devices, as opposed to (or in addition to) representing computing devices.

Data generated by cellular computing devices 10 and 11 and PDA 103 are packetized using, for example, a packet assembler/disassembler. Each packet has a header which includes a packet identification number. Cellular computing devices 10, 11 and PDA 103 generate those packet identification numbers in a sequential manner to facilitate detection of packet loss, as described in detail below. Cellular computing devices 10, 11 and PDA 103 maintain in a storage device two separate arrays, namely, a receiving status array and a transmitting status array. The receiving status array is comprised of record entries for the following fields: a first field which is populated by the packet identification number, a second field which stores a block number associated with one or more packet identification numbers, a third field which is a status field. The latter takes either a value of "1" to acknowledge reception of a packet or a value of "0" to indicate that a packet has not been received. Records for the transmitting status array include two fields, namely a packet identification number and a transmission time field, which indicates the local time when a packet was transmitted or retransmitted by cellular computing device 10 (11) or PDA 103. Because cellular computing device 10 (11) and PDA 103 have limited power and possibly restricted processing capability, cellular computing device 10 (11) and PDA 103 combine several status messages into one status message to conserve power. Thus, cellular computing device 10 (11) and PDA 103 send status messages to wireless network 104 when the last packet in a block transmitted by wireless network 104 is received or when polled by wireless network 104.

Cellular computing device 10 (11) and PDA 11 maintain in their respective storage devices a lower end pointer and an upper end pointer that define a window. The lower end pointer identifies the lowest numbered packet transmitted to and acknowledged by the base station while the upper end pointer identifies the highest numbered packet transmitted to the base station and described in detail below.

Data transmitted by cellular computing devices 10, 11 and PDA 103 are received by one of the cell sites 106, 107, 110 and 112. In the case of PDA 103, the transmitted data is initially received in microcell 108 which, in turn, forwards the received data to cell site 110. Microcell 108 is within the boundaries of the cellular area served by cell site 110. The internal hardware architecture of an illustrative cell site is described below. It is sufficient to say that at this stage cell sites 106, 107, 110 and 112 are the points of access and egress for data transmitted to, and received from, cellular network 104. Specifically, cell sites 106, 107, 110 and 112 perform call setup functions for data calls destined for cellular computing devices 11, 12 and PDA 103 by radiating Radio Frequency (RF) signals to page and locate these devices using special radio channels called "forward control channels", constantly monitored by the cellular telephone sets within cellular computing devices 10, 11 and PDA 103. When a cell site receives call setup signals for calls originated by cellular computing devices 11, 12 and PDA 103, the cell site performs the initial channel assignment and supervises the establishment of the wireless connection. The cell site also tears down a connection at the end of a call. Of particular significance is the function of each of the cell sites 106, 107, 110 and 112 to hand-off or transfer a data call between channels of the different cells as computing cellular devices 11, 12 and PDA 103 move within the cellular geographic area associated with those cells. The hand-off function of a cell site is described in further detail below.

Data received by cell sites 106, 107, 110 and 112 are transmitted to cellular switch 120 via facilities 1061, 1071, 1111 and 1121, respectively.

At the heart of network 104 is cellular switch 120, which is comprised of a set of modular hardware and software components. Cellular switch 120 administers radio channels allocated within the cellular network 104 and coordinates the paging and hand-off functionality described above. One of cellular switch 120 hardware components is the adjunct processor 123, which is a processor-controlled centralized database facility arranged to authenticate subscriber's identification information that is typically received from a cellular telephone set as part of a setup message. Another hardware component of cellular switch 120 is Mobile Switching Center (MSC) 122. The latter provides a seamless communications path for a data call by "bridging" a radio channel and a "wire" channel that is established over land-line communications network 140. Specifically, once a subscriber initiating a call is authenticated by adjunct processor 123, MSC 122 selects the outgoing trunk to land-line network 140 and the radio channel over wireless network 104 by sending a data message to the appropriate cell site to instruct the telephone set associated with the data call to tune to the selected radio channel. MSC 122 also provides an interface to the support systems for Operations, Administration and Maintenance (OA&M) functions. Furthermore, MSC 122 terminates the signaling links of a signaling network (not shown) that is used to exchange call handling messages from land-line network 140 to wireless network 104, according to a specific protocol, such as the well-known Signaling System 7 (SS7).

Of particular importance among the components of cellular switch 120 is base station 121, which includes a processor that executes some of the call processing instructions shown in FIGS. 3, 4, 5 and 6, as described below. The processor copies and stores in its buffer all packets transmitted by base station 121. The processor of base station 121 includes a clock which is used to start and end a poll timer and a status timer at periodic intervals, upon receiving appropriate signals. The poll timer is started when no more space is available in the buffer following the continuous transmission of a number of packets by base station 121. Timing out of the poll timer triggers base station 121 to send a poll message to cellular computing device 10 (11) or PDA 103, inquiring about the status of unacknowledged messages previously transmitted by base station 121 to one of those devices. By contrast, the status timer is arranged to start at periodic intervals and to expire after a predetermined time period. The status timer periodically sends a timeout signal to base station 121 to trigger the transmission of a status message by base station 121 to cellular computing device 10 (11) or PDA 103. The status message either acknowledges reception, or lack thereof, of packets transmitted by cellular computing device 10 (11) or PDA 103 to base station 121.

The status message is a record which includes a packet identification number field and a status field. Entries in the status field represent status of packets transmitted by cellular computing device 10 (11) and PDA 103. For example, an entry of "1" in the status field indicates that a particular packet has been received while an entry of "0" indicates that the packet was lost or corrupted in transit. Thus, the entries within the status field, when received by cellular computing devices 10, 11 or PDA 103, serve the dual purpose of acknowledging received packets within the block and request for retransmission of lost or corrupted packets within the block. Specifically, when all packets transmitted by cellular computing device 10 (11) or PDA 103 are received in sequence by base station 121, the latter sends an acknowledgement message for all received packets. When packets are received out of sequence, base station 121 infers that one or more packets are missing. By way of example, if packet 2, 4 and 5 are received, base station 121 will request retransmission for packet 3. Advantageously, the combination of sequential numbering of packets in the cellular devices and the status timer in base station 121, vitiate the need for a timer in cellular computing devices 10, 11 and PDA 103.

When base station 121 is in a transmitting mode, it uses the packet identification number of each packet received from processor 160 to assign a block number to that packet. Illustratively, the first 2 bits of a packet identification number may be used to assign a block number to that packet. Also maintained in the processor of base station 121 are two pointers $L_{base\ station}$ and $H_{base\ station}$ which point to the lower end and the upper end of a window, respectively. The window represents the number of packets transmitted by base station 121 and unacknowledged by a cellular computing device. Specifically, the pointers in the window indicate that all packets until $L_{base\ station-1}$ have been received. In other words, $L_{base\ station}$ is the first packet which has not been received. By contrast, $H_{base\ station}$ identifies the last packet which has been received. Thus, if $H_{base\ station}=L_{base\ station}-1$, then all packets transmitted by base station 121 to a cellular computing device have been acknowledged by that device.

Although the wireless network 104 shows only a single cellular switch 120, it is to be understood that more than one cellular switch can be included in the wireless network 104.

Also shown in the diagram of FIG. 1 is land-line network 140, which is connected to the wireless network 104 and to the processor 160 via physical facilities 130 and 150, respectively. Land-line network 140 is a Public Switched Telephone Network (PSTN) comprised of a plurality of interconnected switches arranged to route a call to a destination selected by a caller. Alternatively, land-line network 140 may be a public or private data communications network, such as the Internet, or an Asynchronous-Transfer-Mode-based network connected to the PSTN.

Figure 2:
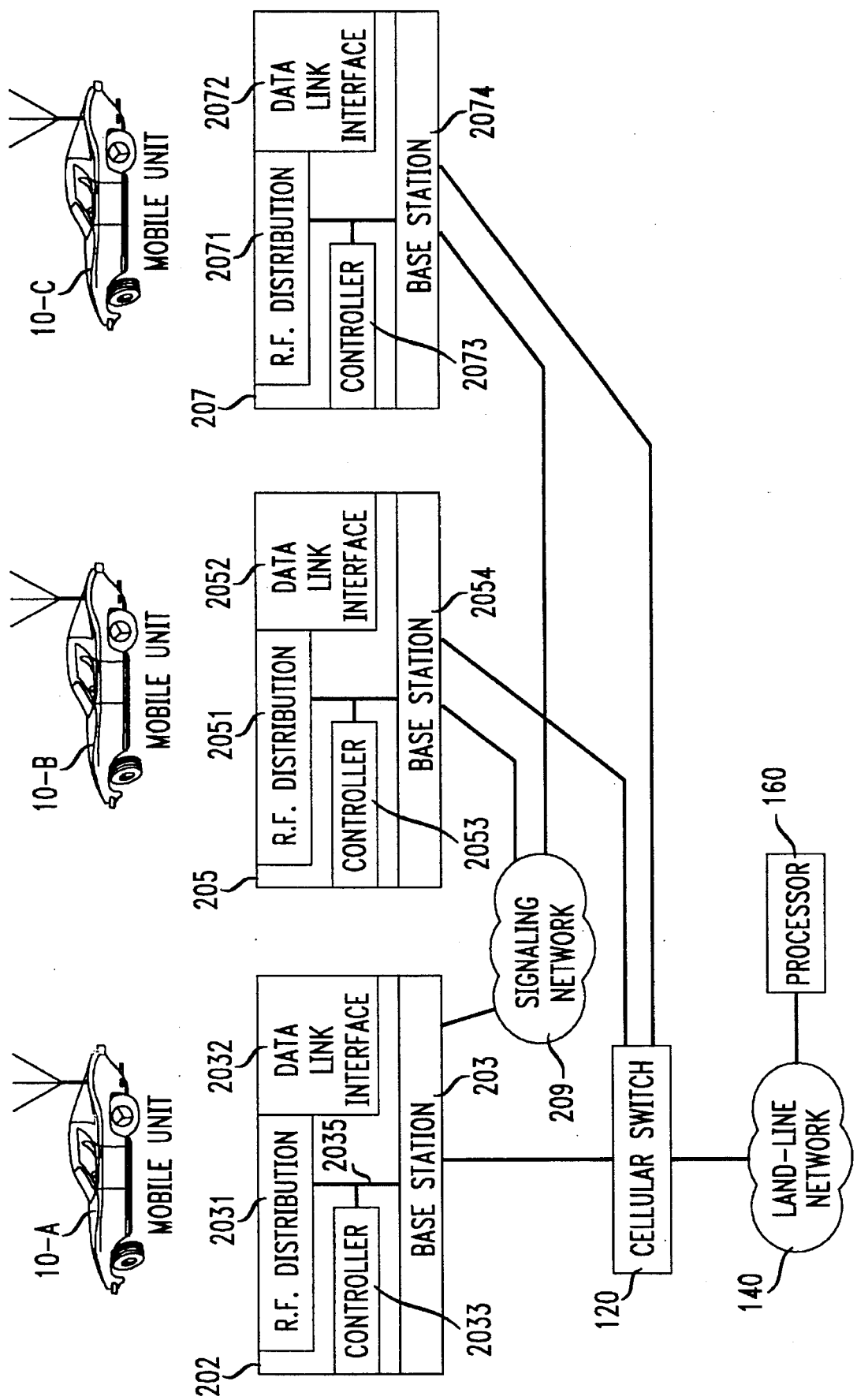
FIG. 2 depicts a configuration for a cellular network in which cell sites are arranged to perform some of the data communications control functions performed by the base station of FIG. 1.

FIG. 2 depicts a configuration for a cellular network in which cell sites are arranged to handle some of the data communications control functions performed by the base station 121 of FIG. 1. Shown in FIG. 2 is cellular computing device 10 of FIG. 1, placed inside a moving vehicle. The cellular computing device 10 is represented as 10-A, 10-B and 10-C, as the vehicle moves in time and space.

Cellular computing device 10 communicates with cell site nodes 202, 205 and 207 over radio channels setup by cellular switch 120 to which, those cell site nodes are connected via wired digital facilities. Each of the cell site nodes include a Radio Frequency (RF) distribution unit, a base station, and a controller. Since those components are identical for all cell site nodes shown in FIG. 2, they will be described for one of those cell site nodes, for example, cell site node 202.

RF distribution unit 2031 is the access and egress point for RF signals radiated and received by cell site node 202. It includes power amplifiers selected to provide sufficient gain for appropriate RF signal to be transmitted via omni or directional antennas (not shown). Also included in RF distribution unit 2031 are receivers with bandpass filters arranged to accept RF signals from the desired channels and to reject all other unwanted channels. Included in RF distribution unit 2031 is Data link interface 2032 which provides the physical connection between the cellular switch 120, the cellular computing device 10 and the signaling network 209.

Base station 203 is the central nerve of cell site node 202. It includes a processor for performing the functions described above for base station 121 of FIG. 1. In addition to those functions, base station 203 also monitors and supervises the activities of the components of cell site 202 through routine maintenance testing and the transmission and reception of control signals via bus 2035. Base station 203 also performs call setup, call supervision and termination functions. Base station 203 receives instructions for selecting radio channels from cellular switch 120. The latter establishes a data connection to processor 160, via land-line network 140.

Base station 203 is also responsible for supervising and coordinating hand-offs to or from another cell site, such as cell site 205 or 207, as cellular computing device 10 crosses the boundaries of cell site 202. As is well-known in the art, a hand-off occurs when cellular computing device 10 moves and changes the base station to which, it is transmitting voice or data signals and from which, it is receiving data signals. As cellular computing device 10 moves and the channel between the mobile terminal and the base station is handed-off from one base station to another, the new base station must assume the protocol state of the old base station. Assumption of the state of the old base station may be derived either from information supplied by the cellular computing device (when for example, the wireless link has been idle for sufficient amount of time) or the old base station when acknowledgement is pending for user data transmitted over the link. Alternatively, a combination of information supplied by the old base station itself and the cellular computing device may be used to assess the state of the old base station.

From the point of view of the protocol endpoint on cellular computing device 10, channel and packet status information consistency is maintained, and the hand-off is transparent to the end-user. In this example, base stations are responsible for exchanging channel and packets status information during a hand-off. Specifically, when cellular computing device 10 crosses the boundaries of a cell site adjacent to the cell site from which it is receiving data signals, cellular computing device 10 informs its new base station as to the identity of its previous base station. The new base station can use this information to contact the old base station to obtain any channel and packets status information it requires. Information transferred from base station-to-base station includes in addition to status timer information and polling timer data, unacknowledged packets that are stored in buffers and that have been transmitted to cellular computing device 10. The base station-to-base station information transfer takes place over signaling network 209, using a defined signaling protocol, such as the Signaling System 7 (SS7). Signaling network 209 may be comprised of interconnected packet switches or high speed Metropolitan Area Networks (MAN).

It is worth noting that the channel and packet status information transfer described above, also takes place when cellular computing device 10 moves from an area served by one cellular network to an adjacent area covered by a different cellular network, assuming the signaling subnetworks of the two cellular networks are interconnected.

Figure 3:
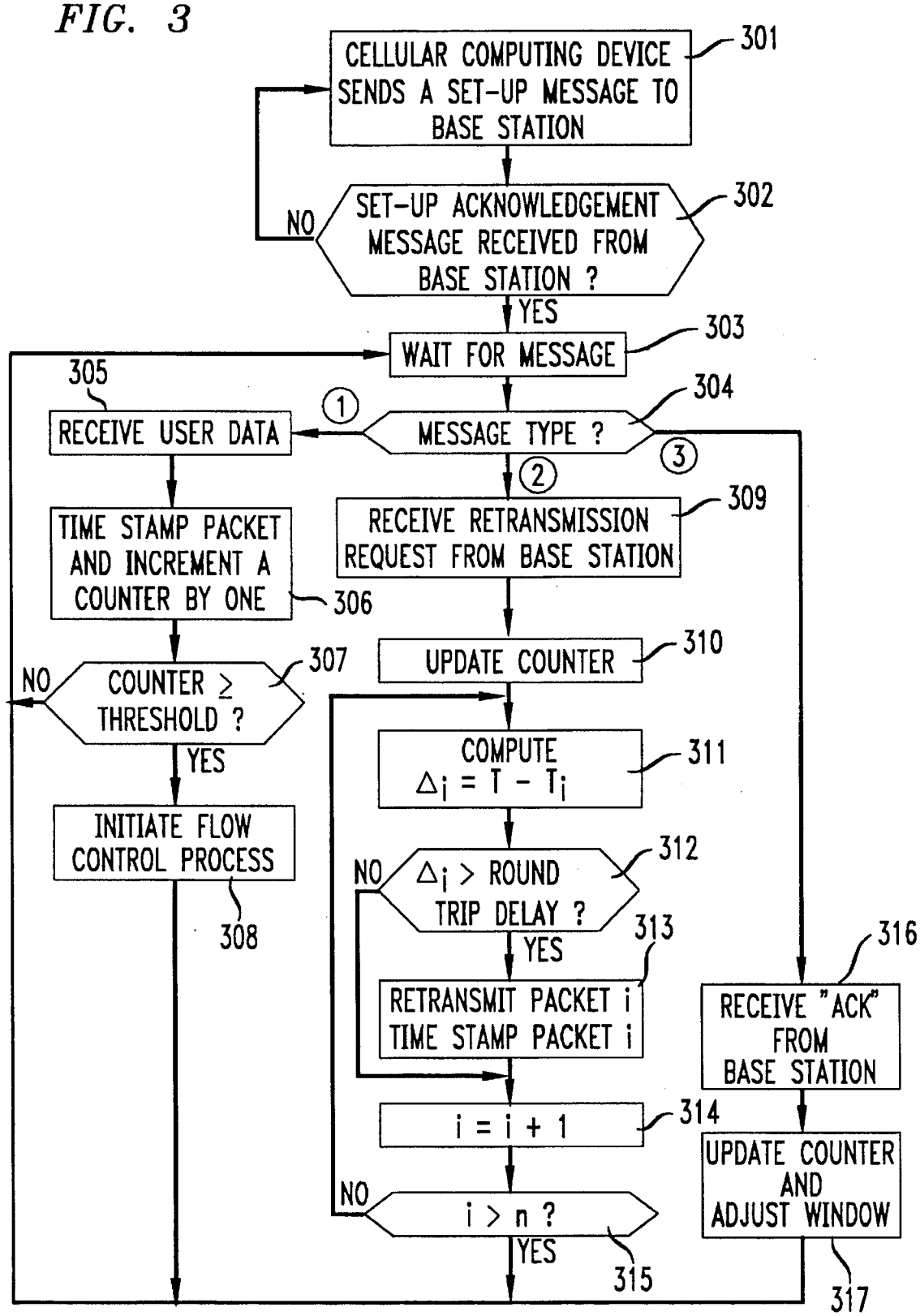
FIGS. 3, 4, 5, and 6 show, in flow diagram format, call processing instructions executed by different elements of the wireless network of FIG. 1 or FIG. 2 to provide reliable data communications service in accordance with the invention.

FIG. 3 shows the call processing instructions executed by a cellular computing device for data transfer from the cellular computing device to a base station at a cell site or a cellular switch. The process is initiated in step 301, when cellular computing device 10, for example, requests a data connection to processor 160 by transmitting a "setup" message to one of the cell sites in FIG. 1, say cell site 106. The setup message includes the telephone number associated with processor 160 and the unique identification number of cellular computing device 10. Cell site 106 forwards the setup message to cellular switch 120 via a dedicated link 1061. Cellular switch 120, upon receiving the setup message, uses the capabilities of adjunct processor 123 to authenticate the identification number of cellular computing device 10. Upon successful completion of the authentication process, cellular switch 120 establishes a connection over land-line network 140 to processor 160. In the meantime, cellular computing device 10 waits for an acknowledgement of the setup message from base station 121. If cellular computing device 10 determines, in step 302, that no such acknowledgement message is forthcoming, cellular computing device 10 continuously transmits the setup message, until an acknowledgement message is received from base station 121. The acknowledgement message is indicative of the establishment of a connection between cellular computing device 10 and base station 121. Accordingly, in step 303, cellular computing device 10 waits to receive data messages from either laptop computer 101 or from base station 121.

Three types of messages are received by cellular computing device 10, namely, user-data messages from laptop computer 101, request for retransmission signaling messages from base station 121 and acknowledgement of packet reception messages from base station 121. Based on the type of message received, as determined in step 304, one of the processes defined in a) step 305 through 308, b) 309 through 315, and c) 316 through 317 is performed.

When cellular computing 10 receives a data packet, from laptop computer 101, in step 305, cellular computing device 10, in step 306, stores a copy of that packet in a buffer, time-stamps the packet by registering the local time in the status record and increments a pre-initialized counter by one, prior to the transmission of that packet. Cellular computing device 10 continuously transmits new packets entered by a user or generated by laptop computer 101, until the counter exceeds a predetermined threshold. The counter threshold defines the maximum number of packets that can be stored in the buffer at any period of time. When the threshold is reached, as determined in step 307, cellular computing device 10, in step 308, initiates a flow control process to temporarily prevent the user or laptop computer 101 from attempting to transmit any additional packets.

When cellular computing device 10, in step 316, receives an acknowledgement message from base station 121, cellular computing device 10 in step 317 "slides" the window by moving the lower end pointer (lowest numbered packet acknowledged, as described above), and decrements the counter by the number of acknowledged packets.

When a retransmission request message is received from base station 121, in step 309, cellular computing device 121, in step 310, updates the counter. Thereafter, cellular computing device 10, in step 311, computes for each packet associated with a retransmission request message, the difference between the present clock time (T) and the time ($T_i$) at which the packet has been time-stamped. If the computed difference ($\Delta_i$) for a particular packet i is greater than the round trip propagation delay between cellular computing device 10 and base station 121, as determined in step 312, the packet in question is time-stamped again and retransmitted in step 313. If the difference is less than the aforementioned propagation delay, the request for retransmission is simply ignored. This is due to the fact that transmission of status packets by base station 121 is time-driven, as opposed to being event-driven. That is, when the status timer in base station 121 expires, a status packet is transmitted by base station 121, while packets are still being transmitted by cellular computing device 10. Thus, user data packets in transit from cellular computing device 10 to base station 121 may be represented as "not received" in a status packet. Advantageously, this aspect of the invention prevents redundant retransmissions between cellular computing device 10 and base station 121. Steps 310 through 325 are repeated for all n packets marked as "not received" in the status packet, until no more packets need to be retransmitted, as determined in step 315.

Alternatively, forward error correction techniques may be used to minimize the number of retransmissions from cellular computing device 10 to base station 121, when packets are lost or corrupted in transit. An exemplary forward error correction technique is described in U.S. Pat. No. 5,007,067, which is incorporated therein by reference. In an implementation of this technique, m bits are taken from each packet within a window of N packets. The m bits are included in M packets to produce N+M packets that are transmitted to base station 121. As long as N packets out of the N+M packets are received, the original N packets can be reconstructed if any packet is lost or corrupted in transit. The process described in FIG. 3 is terminated when cellular computing device 10 receives a disconnect message from base station 121.

Figure 4:
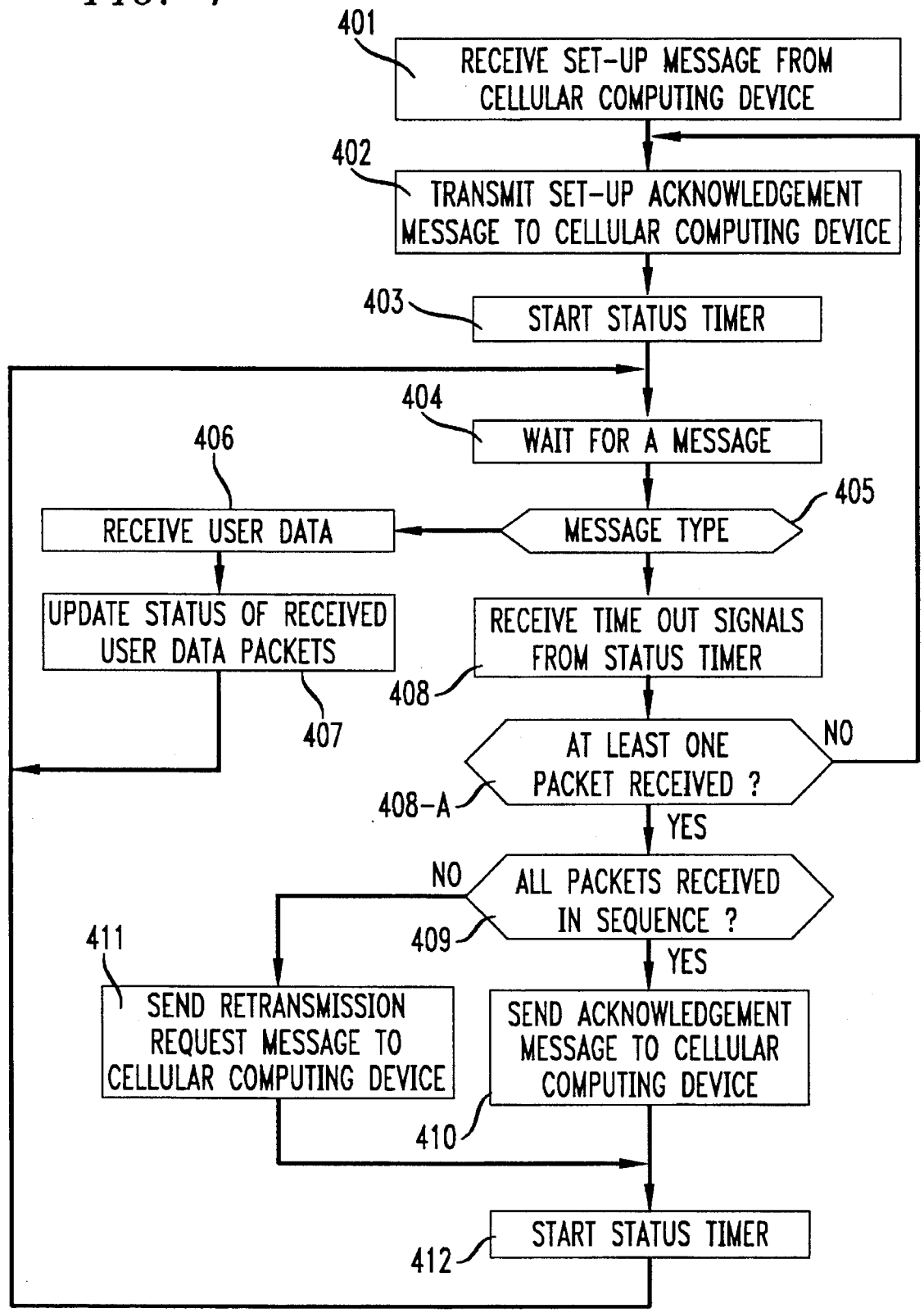

FIG. 4 is a flowchart of the call processing instructions executed by one of base stations 203, 2053, 2054 or 121 to receive, in a reliable fashion, user packet and signaling data transmitted by a cellular computing device. The process associated with these instructions is initiated in step 401 when base station 121, for example, receives a setup message from cellular computing device 10, requesting a connection to processor 160. Once a connection is established, base station 121, in step 402, sends a setup acknowledgement message to cellular computing device 10, and starts a status timer, in step 403. Thereafter, base station 121, in step 404, waits for a message to be received, either from cellular computing device 10 or from the clock therein. When a message is received by base station 121, in step 406, and the received message is packetized user data, as determined in step 405, base station 121, in step 407, registers the identification number of that packet and makes an entry in the status field associated with that packet.

When a message is received by base station 121, in step 408, and the received message is a time-out signal of the status timer, as determined in step 405, base station 121, checks its buffers to ascertain in step 408-A whether at least one data packet was received therein. If no data packet was received by base station 121, steps 402 through 404 are repeated. Otherwise, base station 121 analyzes the header of the last packet received to determine, in step 409, whether all packets have been received in sequence. If so, in step 410, an acknowledgement message is transmitted to cellular computing device 10 and the status timer is restarted in step 412. Thereafter, steps 404 through 412 are repeated. If, however, some packets are deemed missing because they were not received in sequence, as determined in step 409, base station 121, in step 411, transmits a status packet to cellular computing device 10, thereby requesting retransmission of the lost packets, as described above. Thereafter, the status timer is restarted in step 412. The process of FIG. 4 is ended when a disconnect signal is received by base station 121.

When the forward error correction technique described above is implemented, and N packets out of the N+M packets are received from cellular computing device 10, base station 121 reconstructs the original N packets for delivery to processor 160, and sends an acknowledgement message to cellular computing device 10. If less than N packets out of the N+M packets are received from cellular computing device 10, base station 121 sends a request retransmission message to cellular computing device 10.

Figure 5:
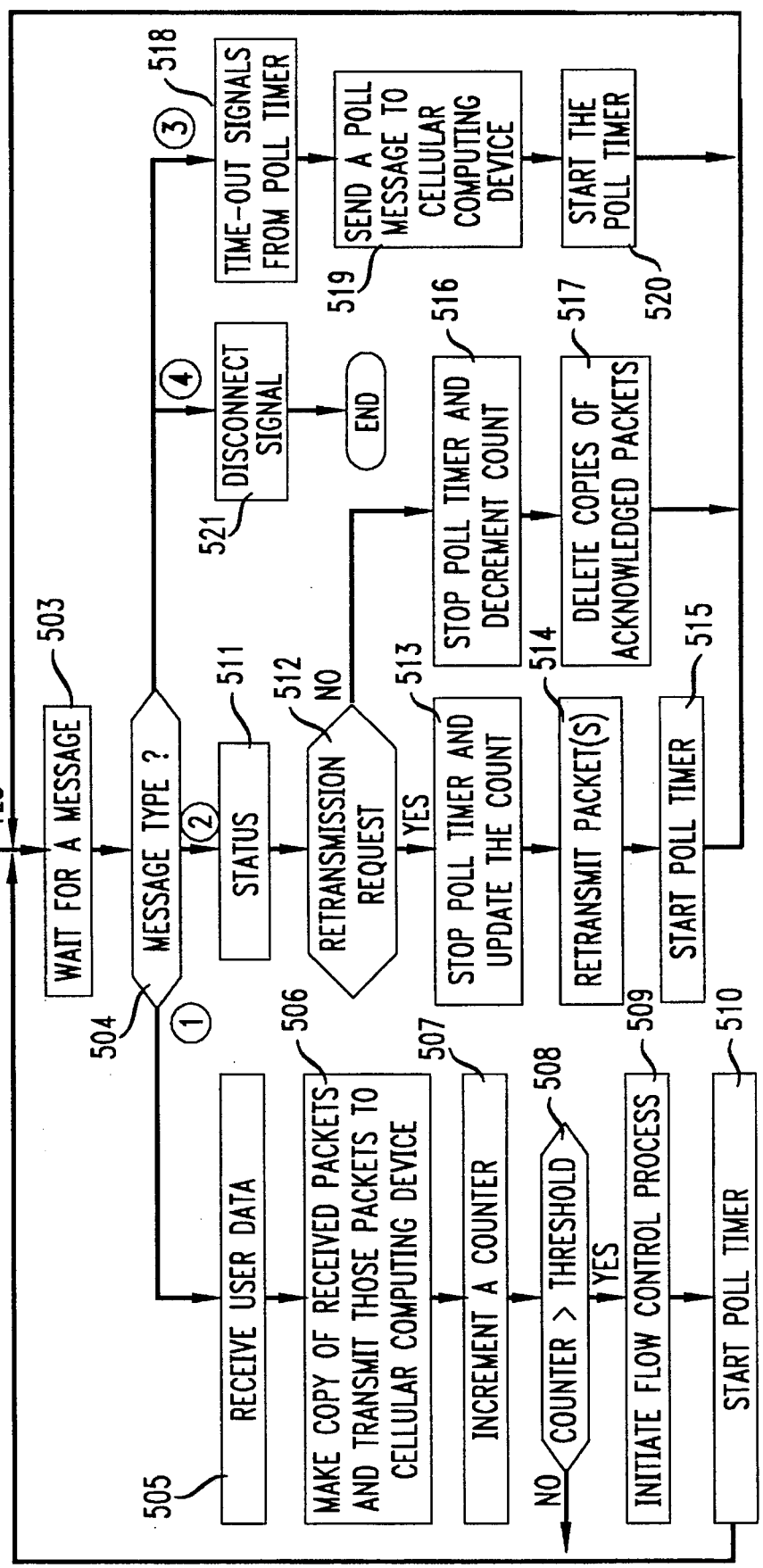

FIG. 5 shows in flow diagram format the call processing instructions executed by a base station for data transfer from that station to a cellular computing device. The process associated with those instructions is initiated in step 501, when base station 121, for example, transmits a setup message to cellular computing device 10 to establish a connection between the device and processor 160. The setup message is continuously transmitted until it is determined, in step 502, that an acknowledgement to the setup message has been received from cellular computing device 10. Thereafter, a connection is established between cellular computing device 10, base station 121 and processor 160. Accordingly, base station 121, in step 503, waits for a message to be received from either processor 160, cellular computing device 10, or a timer process running in the base station itself. Four types of messages may be received by base station 121, namely, user-data messages from processor 160 (step 505); status messages (step 511), such as request for retransmission messages or acknowledgement messages from cellular computing device 10; disconnect messages from either processor 160 or cellular computing device 10 (step 521); and time-out signals from base station 121 timer process (step 518).

When base station 121, in step 505, receives from processor 160 a packetized user data message, as determined in step 504, base station 121, in step 506, copies the received packet and transmits to cellular computing device 10. Thereafter, base station 121, in step 507, increments a counter by one. A determination is then made, in step 508, as to whether the counter has exceeded a predetermined threshold. If so, base station 121 initiates a flow control procedure, in step 510, to prevent processor 160 from transmitting additional packets, and starts a poll timer in step 510. Thereafter, base station 121 repeats steps 503 through 521, as appropriate.

If the aforementioned forward error correction technique is implemented in base station 121, in step 511, the latter takes m bits from each received packet to include these m bits in M packets to produce N+M packets that are transmitted to cellular computing device 10.

When a status message is received by base station 121, as determined in step 504, base station 121 performs a test, in step 512, to inquire as to whether the received status message is a retransmission request signal. If so, base station 121, in step 513, stops the poll timer and increments the counter by one. The requested packet(s) is (are) retransmitted in step 514 and the poll timer is restarted in step 515. Subsequently, steps 503 through 521 are repeated, as needed. When the status message received from cellular computing device is an acknowledgement message, as determined in step 512, base station 121, in step 516, stops the poll timer, decrements the counter by the number of packets whose reception has been acknowledged. Base station 121 proceeds, in step 517, to delete the copies of those packets prior to repeating steps 503 through 521, as needed.

If a time-out signal of the poll timer is received from the timer process running in base station 121, in step 518, base station 121, in step 519, sends a poll message to cellular computing device 10 and restarts the poll timer in step 520. When a disconnect message is received from processor 160, in step 521, base station 121 terminates the call and tears down the connection.

Figure 6:
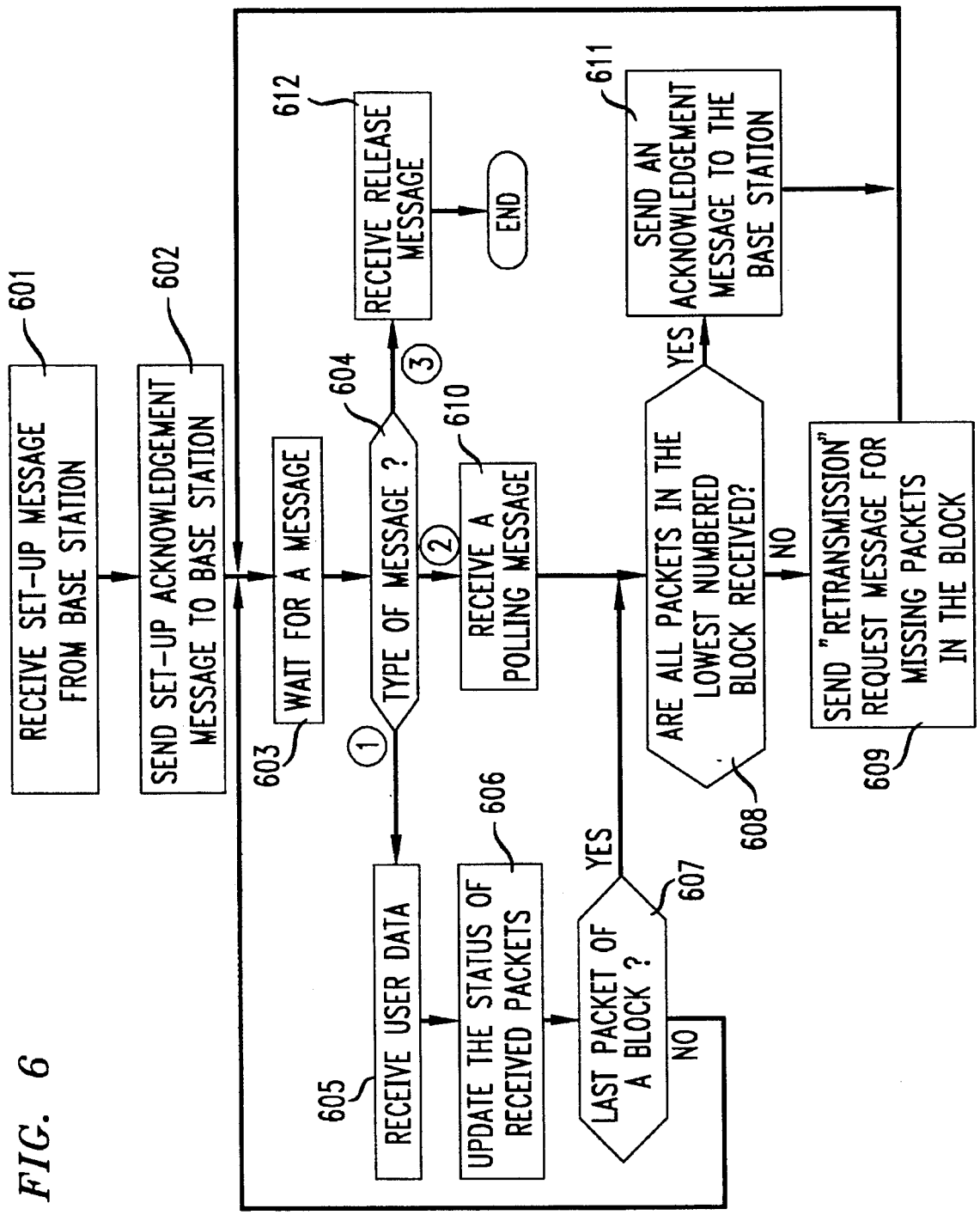

FIG. 6 shows in flow diagram format the call processing instructions executed by cellular computing device 10 to receive data from a base station, such as base station 121. The process associated with those instructions is initiated in step 601 when cellular computing device 10 receives a setup message from base station 121. Cellular computing device 10, in step 602, transmits a setup acknowledgement message to base 121, indicating that a connection is established between the cellular device and base station 121. Thereafter, cellular computing device 10, in step 603, waits for a message to be received from base station 121. Three types of messages may be received by cellular computing device 10, namely, user data messages (step 605), a polling message (step 610), or a release message (step 612).

When cellular computing device 10 receives, in step 605, a packetized user data message from base station 121, as determined, in step 604, cellular computing device 10, in step 606, updates the status packet associated with the block to which the packet belongs. As mentioned above, the header of each packet transmitted by base station 121 includes a packet identification number and a block number and a special bit indicating whether a packet is the last packet within a block. Cellular computing device 10 then determines, in step 607, whether the received packet is the last packet in a block. Upon a determination that other packets from a block are still expected to be received, cellular computing device 10 repeats steps 603 through 612, as needed. If, however, base station 121 determines that the received packet is indeed the last packet within a block, cellular computing device 10 performs a second test. Because packet identification numbers are assigned sequentially by base station 121, cellular computing device 10 can determine, in step 608, whether all packets of the lowest numbered block have been received. If so, cellular computing device 10, in step 611, sends an acknowledgement message to base station 121. Otherwise, a retransmission request message for all the missing packets in the block in question is transmitted to base station 121.

When a polling message is received from base station 121, steps 608 and 609 or 611 are repeated. Subsequently, step 603 through 612 are repeated, as needed. The process is ended when cellular computing device 10 receives a release message from base station 121.

The foregoing is to be construed as only being an illustrative embodiment of this invention. Persons skilled in the an can easily conceive of alternative arrangements providing functionality similar to this embodiment without any deviation from the fundamental principles or the scope of this invention. For example, the foregoing did not specifically address the case of a data connection from one wireless computing device to another wireless computing device, it is to be understood that the principles of this invention are readily applicable to data communications services between two wireless devices.

We claim:

1. A wireless communications system comprising:

at least one base station which a) transmits data packets to, and receives data packets from at least one wireless end-user device over a wireless link, b) sends to the at least one wireless end-user device at predetermined periodic intervals i) unsolicited status messages of data packets received from the at least one wireless end-user device, and ii) polling messages to inquire about the status of data packets transmitted to, but unacknowledged by the at least one wireless end-user device after a predetermined time period, and c) stores channel information for the wireless link, and status information of received and transmitted data packets; and within the at least one wireless end-user device processing means for i) determining whether data packets received from the at least one base station are received in sequence, and ii) requesting retransmission of missing data packets, the processing means having means for time-stamping each data packet prior to the transmission of each data packet by the wireless end-user device, and in response to a request for retransmission of one or more data packets by the at least one base station, means for computing the difference between the present time and the stamped time of each data packet for which retransmission is being requested, and the processing means initiating retransmission of the one or more data packets if propagation delay between the at least one wireless end-user device and the at least one base station is less than the computed time difference.

2. The system of claim 1 further comprising means for the at least one base station for copying from each of N data packets, m bits that are combined in M data packets to form N+M data packets transmitted to the wireless end-user device such that if at least one of the N+M data packets is lost during transmission, N data packets can be reconstructed by the wireless end-user device as long as N data packets out of the N+M data packets are received by the wireless end-user device.

3. The system of claim 1 further comprising:

means for the wireless end-user device for copying from each of N data packets m bits that are combined in M data packets to form N+M data packets transmitted to the at least one base station such that if at least one of the N+M data packets is lost during transmission, N data packets can be reconstructed by the at least one base station as long as N data packets out of the N+M data packets are received by the wireless end-user device.

4. A method of providing data communications services between at least one wireless end-user device and at least one base station over a wireless communications link of a data connection, the method comprising the steps of:

communicating data packets between the at least one wireless end-user device and the at least one base station;

transmitting at predetermined periodic intervals from the at least one base station to the at least one wireless end-user device i) unsolicited status messages of data packets transmitted to the at least one base station by the at least one wireless end-user device, and ii) polling messages to inquire about the status of data packets transmitted by the at least one base station to the at least one wireless end-user device, but unacknowledged by the at least one wireless end-user device after a predetermined time period;

storing in the at least one base station channel information for the wireless link, and status information of data packets received therein and of data packets transmitted to the wireless end-user device;

determining in the at least one wireless end-user device whether data packets transmitted thereto by the at least one base station are received in sequence;

requesting retransmission of missing data packets;

time-stamping each data packet prior to the transmission of each data packet by the wireless end-user device;

in response to a request for retransmission of one or more data packets by the at least one base station, computing the difference between the present time and the stamped time of each data packet for which retransmission is being requested; and retransmitting the one or more data packets if propagation delay between the at least one wireless end-user device and the the at least one base station is less than the computed time difference.

5. The method of claim 4 further comprising the step of:

copying m bits from each of N data packets, the m bits being combined in M data packets to form N+M data packets transmitted by the at least one base station to the wireless end-user device such that if at least one of the N+M data packets is lost during transmission, N data packets can be reconstructed by the wireless end-user device as long as N data packets out of the N+M data packets are received by the wireless end-user device.

6. The method of claims 4 further comprising the step of:

copying m bits from each of N data packets, the m bits being combined in M data packets to form N+M data packets transmitted by the at least one wireless end-user device to the at least one base station such that if at least one of the N+M data packets is lost during transmission, N data packets can be reconstructed by the at least one base station as long as N data packets out of the N+M data packets are received by the at least one base station.

7. An end-user wireless device for communicating data packets over a cellular network, said device comprising:

a transmitter for sending signaling information to a base station of a wireless network to establish a connection thereto, and thereafter for continuously transmitting sequentially numbered user-data packets to a base station of the cellular network until a buffer in which, each data packet is copied and time-stamped prior to transmission, is full;

a receiver for receiving from the base station a) user-data packets b) messages acknowledging reception of previously transmitted data packets, and c) messages requesting retransmission of unreceived data packets;

in response to receiving a request for retransmission of one or more particular data packets, means for computing the difference between the current time and the stamped time of each particular data packet for which retransmission is requested;

retransmitting each particular data packet for which the computed difference between current time and the stamped time is greater than propagation delay over the cellular network between the wireless end-user device and the base station; and in response to receiving a request acknowledging reception of specific previously transmitted data packets, means for deleting copies of the specific data packets in the buffer.

8. A base station of a cellular network for communicating data packets, comprising:

a transmitter which exchanges signaling information to a wireless computing device to establish a connection thereto, and thereafter continuously transmits sequentially numbered user-data packets to the wireless computing device until a buffer in which, each data packet is copied prior to transmission, is full;

a receiver which receives from the cellular computing device a) user-data packets, b) messages that acknowledge reception of specific, previously transmitted, data packets, and that request retransmission of unreceived data packets, and signals from a clock that starts and stops a poll timer and a status timer;

in response to receiving a signal indicating that the status timer has expired, means for a) determining whether all packets transmitted thereto by the cellular computing device have been received in sequence and b) requesting from the cellular computing device retransmission of unreceived packets; and in response to receiving a signal indicating that the poll timer has expired, means for requesting status information of user data packets transmitted to the cellular computing device.

* * * * *